(12) United States Patent
Pan et al.

(10) Patent No.: US 11,121,545 B2
(45) Date of Patent: Sep. 14, 2021

(54) HOT SWAPPING PROTECTION DEVICE FOR POWER OVER ETHERNET AND METHOD THEREOF

(71) Applicant: ANTAIRA TECHNOLOGIES, LLC, Brea, CA (US)

(72) Inventors: Woody Pan, New Taipei (TW); Zhi Huei Shao, New Taipei (TW)

(73) Assignee: ANTAIRA TECHNOLOGIES, LLC, Brea, CA (US)

( * ) Notice: Subject to any disclaimer, the term of this patent is extended or adjusted under 35 U.S.C. 154(b) by 0 days.

(21) Appl. No.: 17/038,830

(22) Filed: Sep. 30, 2020

(65) Prior Publication Data

US 2021/0104889 A1   Apr. 8, 2021

(30) Foreign Application Priority Data

Oct. 8, 2019   (TW) .................. 108136440

(51) Int. Cl.
  *H04B 1/38*   (2015.01)
  *H02H 9/00*   (2006.01)
  *H04L 12/10*  (2006.01)
  *G06F 1/26*   (2006.01)

(52) U.S. Cl.
  CPC ............ *H02H 9/008* (2013.01); *G06F 1/263* (2013.01); *H04B 1/38* (2013.01); *H04L 12/10* (2013.01)

(58) Field of Classification Search
  CPC . H04B 1/38; H04L 12/10; G06F 1/263; H02J 3/06; H02J 4/00; H02H 9/008
  See application file for complete search history.

(56) References Cited

U.S. PATENT DOCUMENTS 7,660,345 B2 * 2/2010 Yu ............................ H04B 3/54
                                                    375/222
2007/0177411 A1 * 8/2007 Picard .................... H04L 12/10
                                                    363/35

* cited by examiner

*Primary Examiner* — Nguyen Tran
*Assistant Examiner* — Afework S Demisse
(74) *Attorney, Agent, or Firm* — Rabin & Berdo, P.C.

(57) ABSTRACT

A hot swapping protection device for Power over Ethernet which has a state setting switch group, an interface circuit, a power supply device, a packet switching controller, multiple isolation coil sets, and multiple connectors. The packet switching controller receives a digital state value P2 of the interface circuit and a digital signal P1 of the state setting switch group and bitwise compares P1 and P2 so as to output a command to control the DC voltage outputs of the power supply device. The power supply device has a digital power controller and an analog power controller having multiple voltage output terminals for providing DC voltages to the multiple connectors. Before removing a cable connected to a connector, all voltage output states of the voltage output terminals corresponding to the connector are set to a cutoff state, so that sparks generation can be avoided during subsequent cable plug-in and unplugging.

8 Claims, 4 Drawing Sheets

US 11,121,545 B2

HOT SWAPPING PROTECTION DEVICE FOR POWER OVER ETHERNET AND METHOD THEREOF

CROSS REFERENCE TO RELATED APPLICATION(S)

This non-provisional application claims the benefit under 35 U.S.C. § 119(e) to patent application No. 108136440 filed in Taiwan on Oct. 8, 2019, which is hereby incorporated in its entirety by reference into the present application.

BACKGROUND OF THE INVENTION

1. Field of the Invention

The present invention relates to a hot swapping protection device, especially a hot swapping protection device for Power over Ethernet and a method thereof.

2. Description of the Related Art

Nowadays, it is common for an Ethernet switch to have the function of Power over Ethernet (PoE). PoE is an important technology to supply power and is mainly used in places where there is an Ethernet cable, especially for places where power supply is not available yet an Ethernet cable is in proximity. PoE is endowed with a plug-and-play function, so users can conveniently and cost-effectively utilize PoE when suitable, and disregard other kinds of power sources. The main operation of PoE is that a Power Sourcing Equipment (PSE) provides a direct current (DC) power to a Powered Device (PD) via the Ethernet cable, and when the PD receives the power from the PSE via the Ethernet cable, the PD and the PSE will go through a series of handshaking to ensure that the PoE operation is adequate. The PSE is usually a set of circuits in an Ethernet switch or an external device integrated with an Ethernet switch, and the PD is usually a security camera, a Femtocell, a VoIP phone, a signage/display, lighting, medical equipment, vehicle infotainment, point of sales, sensors of a Radio Frequency Identification (RFID) system and any other equipment or device connected to the Ethernet network.

In case of emergency while PoE is supplying power, there could be an urgent need to disconnect the Ethernet cable immediately to stop the power supplying from PoE. At this moment, if the Ethernet cable is directly disconnected by unplugging, then during the disconnecting process, sparks may be generated. In some dangerous environments, such sparks may cause a fire. Presently, with the enhancement of PoE standards, the power provided by the PoE technology has been increased, and compounded with the tremendous popularity of PoE applications, the above security issues no longer can be ignored.

SUMMARY OF THE INVENTION

In view of the above-mentioned problems, the main purpose of the present invention is to provide a hot swapping protection device for Power over Ethernet (hereinafter abbreviated as hot swapping protection device) so that users can directly switch an output power state of each network connector to turn off the output voltage in advance and with ease, thereby providing a simple and effective security protection mechanism.

The hot swapping protection device for Power over Ethernet of the present invention includes:

a state setting switch group including multiple switches configured to set a digital signal P1 and to output the digital signal P1;

an interface circuit having a digital state value P2, wherein the interface circuit is electrically connected to the state setting switch group and receives the digital signal P1 from the state setting switch group;

a power supply device to output at least one pair of DC voltages;

a packet switching controller including a central processing unit electrically connected to the interface circuit, receiving the digital state value P2 and the digital signal P1 from the interface circuit, and comparing bitwise the received digital state value P2 and the received digital signal P1 so as to output a command to control and to output the at least one pair of DC voltages of the power supply device.

In one embodiment, the packet switching controller further includes a physical layer transceiver which includes multiple output differential signal terminals and multiple input differential signal terminals.

In one embodiment, the hot swapping protection device for Power over Ethernet further includes:

multiple isolation coil sets, wherein each isolation coil set has a first side and a second side, and on the first side, each isolation coil set is electrically connected to corresponding output differential signal terminals and corresponding input differential signal terminals among the multiple output differential signal terminals and the multiple input differential signal terminals;

multiple identical and independent connectors, where each connector is on the second side of a corresponding isolation coil set among the multiple isolation coil sets, and inductively coupled to the corresponding output differential signal terminals and corresponding input differential signal terminals through the corresponding isolation coil set.

In one embodiment, the power supply device further includes:

a digital power controller which is electrically connected to the central processing unit, receives the command from the central processing unit, and outputs a control signal accordingly;

an analog power controller having multiple voltage output terminals where each of the multiple voltage output terminals is electrically connected to the second side of a corresponding isolation coil set among the multiple isolation coil sets, and the analog power controller being electrically connected to the digital power controller, and receiving the control signal from the digital power controller, thereby to control voltage output states of the multiple voltage output terminals, wherein the voltage output states includes a normal output state and a cutoff state.

In one embodiment, each of the multiple connectors outputs a pair of DC voltages to an external network device through a cable as the power source for the external network device, and before removing a cable connected to a corresponding connector among the multiple connectors, all the voltage output states of the voltage output terminals corresponding to said connector are set to be the cutoff state.

In one embodiment, the state setting switch group further includes:

multiple switches and each of the multiple switches including:
an output terminal;
an input terminal;

a grounding resistor having two ends which are respectively electrically connected to a grounding voltage and the output terminal;

a pull-up resistor having two ends which are respectively electrically connected to a digital voltage and the input terminal; and a first button which is switchable to an on-state or an off-state;

when the first button is switched to the on-state, the voltage at the output terminal is a digital high-level voltage, and when the first button is switched to the off-state, the voltage at the output terminal is a digital low-level voltage.

Moreover, in one embodiment, the present invention further discloses a power supplying method which provides a hot swapping protection device for Power over Ethernet and includes the steps:

S0: setting an initial value for a digital state value P2 of an interface circuit, and setting said initial value for a digital signal P1 of a state setting switch group;

S1: setting the value of the digital signal P1 of the state setting switch group, and when the digital signal P1 and the digital state value P2 are the same, repeating step S1, and when the digital signal P1 and the digital state value P2 are not the same, proceeding to step S2;

S2: providing an interrupt signal to a packet switching controller by the interface circuit;

S3: reading the digital signal P1 and the digital state value P2 by the packet switching controller;

S4: comparing the digital signal P1 and the digital state value P2 bitwise;

S5: finding all bits which are "1" in the digital signal P1 and "0" in the digital state value P2, and changing the voltage output states to cutoff states for all voltage output terminals corresponding to all the bits found; and finding all bits which are "0" in the digital signal P1 and "1" in the digital state value P2, and changing the voltage output states to normal output states for all voltage output terminals corresponding to all the bits found;

S6: changing the digital state value P2 to be the same as the digital signal P1, and returning to step S1.

Therefore, a hot swapping protection device for Power over Ethernet and a method thereof of the present invention can avoid the generation of spark that may occur when hot swapping the Ethernet cable, and thus the purpose of the present invention can be achieved.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1A:
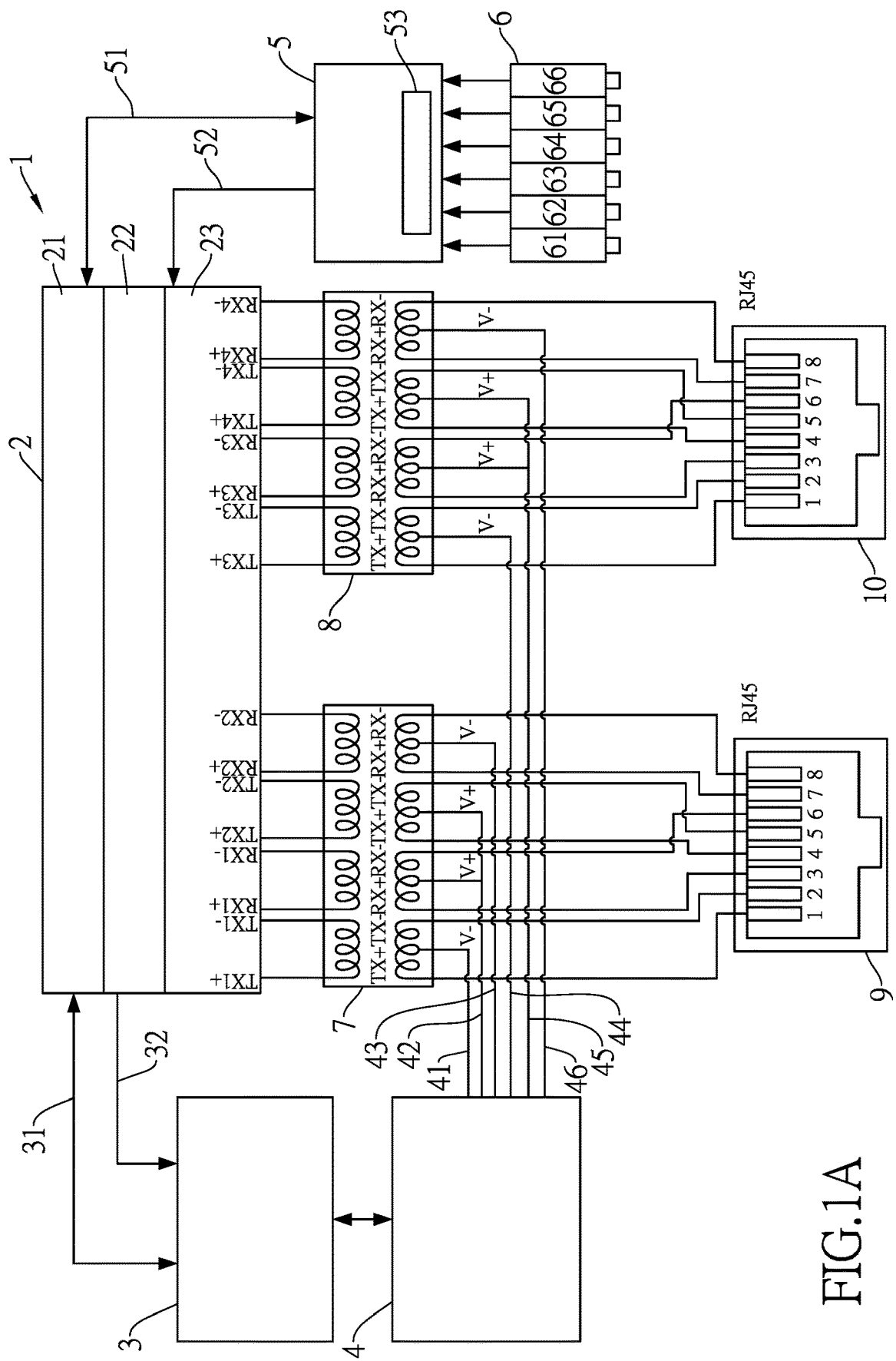
FIG. 1A is a main circuit diagram of a hot swapping protection device of the present invention.
Figure 1B:
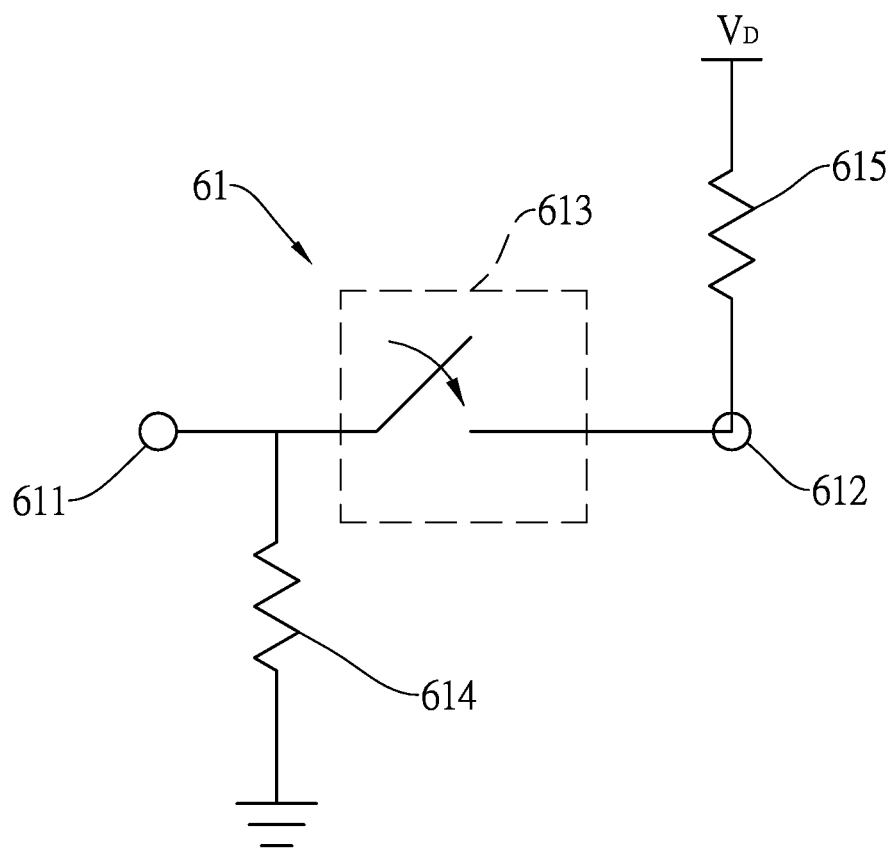
FIG. 1B is a circuit diagram of the first switch in the hot swapping protection device of the present invention.

With reference to FIGS. 1A and 1B, in this embodiment, the hot swapping protection device 1 of the present invention has a packet switching controller 2, a digital power controller 3, an analog power controller 4, an interface circuit 5, a state setting switch group 6, a first isolation coil set 7, a second isolation coil set 8, a first connector 9 and a second connector 10. Each of the first connector 9 and the second connector 10 has eight contacts, which are respectively connected to four pairs of transmission lines.

The packet switching controller 2 includes a central processing unit (CPU) 21, a media access control (MAC) 22, and a physical layer transceiver (PHY) 23, wherein the physical layer transceiver 23 has first to fourth pairs of output differential signal terminals, namely (TX1+, TX1−), (TX2+, TX2−), (TX3+, TX3−), (TX4+, TX4−), and first to fourth pairs of input differential signal terminals, namely (RX1+, RX1−), (RX2+, RX2−), (RX3+, RX3−), (RX4+, RX4−). The first to second pairs of output differential signal terminals and the first to second pairs of input differential signal terminals are interleaved and are inductively coupled to the first connector 9 via a first isolation coil set 7, so that the eight contacts of the first connector 9 respectively correspond to the differential signal terminals TX1+, TX1−, RX1+, TX2+, TX2−, RX1−, RX2+, RX2− sequentially from left to right. The third to fourth pairs of output differential signal terminals and the third to fourth pairs of input differential signal terminals are interleaved and inductively coupled to the second connector 10 via the second isolation coil set 8, so that the eight contacts of the second connector 10 respectively correspond to the differential signal terminals TX3+, TX3−, R3X+, TX4+, TX4−, RX3−, RX4+, RX4− sequentially from left to right.

The first connector 9 and the second connector 10 are both RJ45 connectors for Ethernet, and each of the first connector 9 and the second connector 10 can be respectively connected to other network devices via an Ethernet cable having multiple pairs of transmission lines, such as a CAT5 Ethernet cable.

The first isolation coil set 7 and the second isolation coil set 8 each have four identical and independent coupling coils, and each coupling coil includes a first-side inductive coil and a second-side inductive coil that are independent and inductively coupled to each other. Each coupling coil can bi-directionally and inductively couple a pair of alternating current (AC) signals of the first-side inductive coil to a pair of AC signals of the second-side inductive coil, and vice versa. At the same time, each of the second-side inductive coils can conduct a DC current independently and will not short-circuit with other second-side inductive coils.

The digital power controller 3 further has a first I2C interface 31 and a first interrupt signal terminal 32, and is electrically connected to the packet switching controller 2 through the first I2C interface 31 and the first interrupt signal terminal 32. The digital power controller 3 is electrically connected to the analog power controller 4, and is configured to control the DC power output of the analog power controller 4.

The analog power controller 4 is used to provide DC power to the eight contacts of the first connector 9 and the eight contacts of the second connector 10. The digital power controller 3 is a mixed-mode circuit, is configured to communicate between the analog power controller 4 and the packet switching controller 2, and at the same time the digital power control 3 can completely isolate the high analog voltage of the analog power controller 4 from other circuits of the hot swapping protection device 1, such as the packet switching controller 2, and so on.

The analog power controller 4 has first to sixth voltage output terminals 41 to 46, wherein the first and third voltage output terminals 41, 43 are outputting a DC low voltage V− and electrically connected respectively to two second-side inductive coils corresponding to the two pairs of differential signal terminals, namely (TX1+, TX1−) and (RX2+, RX2−) in the first isolation coil set 7. The fourth and sixth voltage output terminals 44, 46 are outputting the DC low voltage V− and electrically connected respectively to two second-side inductive coils corresponding to the two pairs of differential signal terminals, namely (TX3+, TX3−) and (RX4+, RX4−) in the second isolation coil set 8. Moreover, the second voltage output terminal 42 is outputting a DC high voltage V+ and electrically connected to two second-side inductive coils corresponding to the two pairs of differential signal terminals, namely (RX1+, RX1−) and (TX2+, TX2−) in the first isolation coil set 7. The fifth voltage output terminal 45 is outputting the DC high voltage V+ and electrically connected to the two pairs of second-side inductive coils corresponding to the two pairs of differential signal terminals, namely (RX3+, RX3−) and (TX4+, TX4−) in the second isolation coil set 8.

Figure 1C:
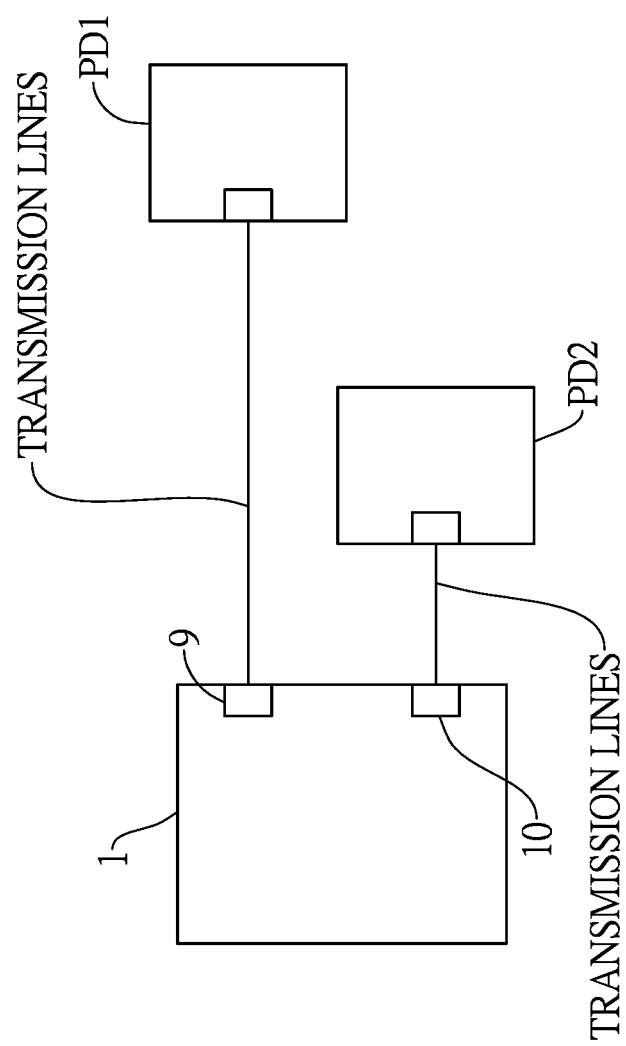
FIG. 1C is a circuit diagram of the hot swapping protection device connected to an external network device of the present invention.

Please refer to FIGS. 1A and 1C. The first voltage output terminal 41 outputs the DC low voltage V− to a pair of transmission lines corresponding to the first pair of output differential signal terminals (TX1+, TX1−), so as to provide the DC low voltage V− to the first external network device PD1 connected to the first connector 9. The second to third voltage output terminals 42 to 43 respectively output their DC voltages to corresponding pairs of transmission lines so as to provide the DC high voltage V+ and the DC low voltage V− to the first external network device PD1 connected to the first connector 9. Similarly, the fourth to sixth voltage output terminals 44 to 46 respectively output their DC voltages to corresponding pairs of transmission lines so as to provide the DC power to the second external network device PD2 connected to the second connector 10. It can be known from the above-mentioned that the union of the digital power controller 3 and the analog power controller 4 is the aforesaid PSE, and the first to second external network devices PD1 to PD2 respectively connected to the first connector 9 and the second connector 10 are the aforesaid PD.

Please refer to FIGS. 1A, 1B. The above-mentioned state setting switch group 6 includes independent and identical first to sixth switches 61 to 66 for controlling output voltages of the first to sixth voltage output terminals 41 to 46 respectively, where the circuit of the first switch 61 includes an output terminal 611, an input terminal 612, a first button 613, a grounding resistor 614, and a pull-up resistor 615. The two ends of the grounding resistor 614 are electrically connected to a ground voltage and the output terminal 611 respectively. The two ends of the pull-up resistor 615 are electrically connected to a digital voltage $V_D$ and the input terminal 612 respectively, wherein the resistance value of the ground resistor 614 is at least 5 times that of the pull-up resistor 615. The button 613 has two states, namely an on-state and an off-state. When the button 613 is switched to an on-state, the voltage at the output terminal 611 is pulled to a high-level voltage representing "1" in digital logic, and when the button 613 is switched to an off-state, the output terminal 611 is pulled to ground voltage through the grounding resistor 614, so the voltage at the output terminal 611 is at ground voltage representing "0" in digital logic. The circuits of the second to sixth switches 62 to 66 are the same as the circuit of the first switch 61. The user can respectively and independently configure the output values of the first to sixth switches 61 to 66 of the state setting switch group 6 to be either digital logic "1" or "0" by way of switching the states of the first to sixth buttons 613, 623, 633, 643, 653, and 663 respectively, and thereby the state setting switch group 6 can thus output a 6-bit digital signal P1.

The aforementioned interface circuit 5 has a second I2C interface 51 and a second interrupt signal terminal 52 through which the interface circuit 5 is electrically connected to the packet switching controller 2. The interface circuit 5 further has a register 53 for storing a digital state value P2 which reflects the present voltage output states of the first to sixth voltage output terminals 41 to 46 of the analog power controller 4. For example, each bit value of the digital state value P2 is "0" or "1" to indicate a voltage output terminal corresponding to the bit is in a normal output state or a cutoff state, i.e. a high impedance state; so when the digital state value P2 is "000000", the voltage output states of the first to sixth voltage output terminals 41 to 46 are all normal output states, and when the digital state value P2 is "111000", the voltage output states of the first to third voltage output terminals 41 to 43 are cutoff states, and the voltage output states of the fourth to sixth voltage output terminals 44 to 46 are normal output states. The interface circuit 5 further has a set of general purpose input terminals which are electrically connected to the output terminals of the state setting switch group 6, and the interface circuit 5 will read the digital signal P1 in real time from the state setting switch group 6 via the set of general purpose input terminals. Then, the interface circuit 5 compares the value of the digital signal P1 with the digital status value P2. When the value of the digital signal P1 is not equal to the digital status value P2, the interface circuit 5 will send an interrupt signal to the packet switching controller 2 through the second interrupt signal terminal 52. After receiving the interrupt signal, the packet switching controller 2 reads the digital signal P1 and the digital state value P2 through the second I2C interface 51, and compares the digital state value P2 and the digital signal P1 bitwise. For example: when the first bit value of the digital state value P2 is "0" and the first bit value of the digital signal P1 is "1", it means that the user has reset the first bit value of the digital signal P1 so as to change the voltage output state of the first voltage output terminal 41 of the analog power controller 4 from the present normal output state to the cutoff state. On the other hand, when the first bit value of the digital state value P2 is "1" and the first bit value of the digital signal P1 is "0", it means that the user has reset the first bit value of the digital signal P1 so as to change the voltage output state of the first voltage output terminal 41 of the analog power controller 4 from the present cutoff state to the normal output state. For other bits of the digital signal P1 and the digital state value P2, their operations can be deduced by analogy. After the packet switching controller 2 confirms all the bits with different bit values between the digital state value P2 and the digital signal P1, the packet switching controller 2 will notify the digital power controller 3 through the first interrupt signal terminal 32 to receive commands in real time through the first I2C interface 31. After receiving the commands from the packet switching controller 2, the digital power controller 3 controls the analog power controller 4 to change the output states of the voltage output terminals corresponding to all of the bits with said different bit values among the voltage output terminals 41 to 46. Afterwards, the packet switching controller 2 will change the value of the digital state value P2 to make it the same as the current digital signal P1 so as to be consistent with the just-changed voltage output states of the voltage output terminals among the voltage output terminals 41 to 46 of the analog power controller 4.

In order to avoid sparks when hot swapping the Ethernet cable connected to the first connector 9 or the second connector 10, the user can first set the related switches in the above-mentioned state setting switch group 6 to turn off the corresponding voltage output terminals of the analog power controller 4 in advance, and afterwards the user may safely plug in or unplug the Ethernet cable with respect to the first connector 9 or the second connector 10, thereby achieving the purpose of hot swapping protection of the present invention. For example, when the digital state value P2 is "000000", and before the user plugs in or unplugs the Ethernet cable with respect to the first connector 9, the user first resets the buttons 613, 623, and 623 of the first to third switches 61 to 63 of the state setting switch group 6 to be the off-state, with the buttons 643, 653, and 663 in the fourth to sixth switches 64 to 66 in the state setting switch group 6 remaining in the on-state, and thereby the digital signal P1 outputted by the state setting switch group 6 assumes the value "111000". As the values of digital signal P1 and digital state value P2 are different, the packet switching controller 2 will receive an interrupt signal from the interface circuit 5, and then the packet switching controller 2 reads in the digital signal P1 and the digital state value P2, based on which the packet switching controller 2 controls the analog power controller 4 via the digital power controller 3, so that the first to third voltage output terminals 41 to 43 of the analog power controller 4 stop supplying power, and afterwards the user may safely plug in or unplug the Ethernet cable with respect to the first connector 9. Similarly, when the digital state value P2 is "000000", and before the user plugs in or unplugs the Ethernet cable with respect to the first connector 10, the user first resets the buttons 643, 653, and 663 of the fourth to sixth switches 64 to 66 of the state setting switch group 6 to be the off-state, with the buttons 613, 623, and 623 of the first to third switches 61 to 63 of the state setting switch group 6 remaining in the on-state, and thereby the digital signal P1 outputted by the state setting switch group 6 assumes the value "000111". Then, as the values of the digital signal P1 and the digital state value P2 are different, the packet switching controller 2 will receive an interrupt signal from the interface circuit 5, and then the packet switching controller 2 reads in the digital signal P1 and the digital state value P2, based on which the packet switching controller 2 controls the analog power controller 4 via the digital power controller 3, so that the fourth to sixth voltage output terminals 44 to 46 of the analog power controller 4 stop supplying power, and afterwards the user may safely plug in or unplug the Ethernet cable with respect to the first connector 10.

Figure 2:
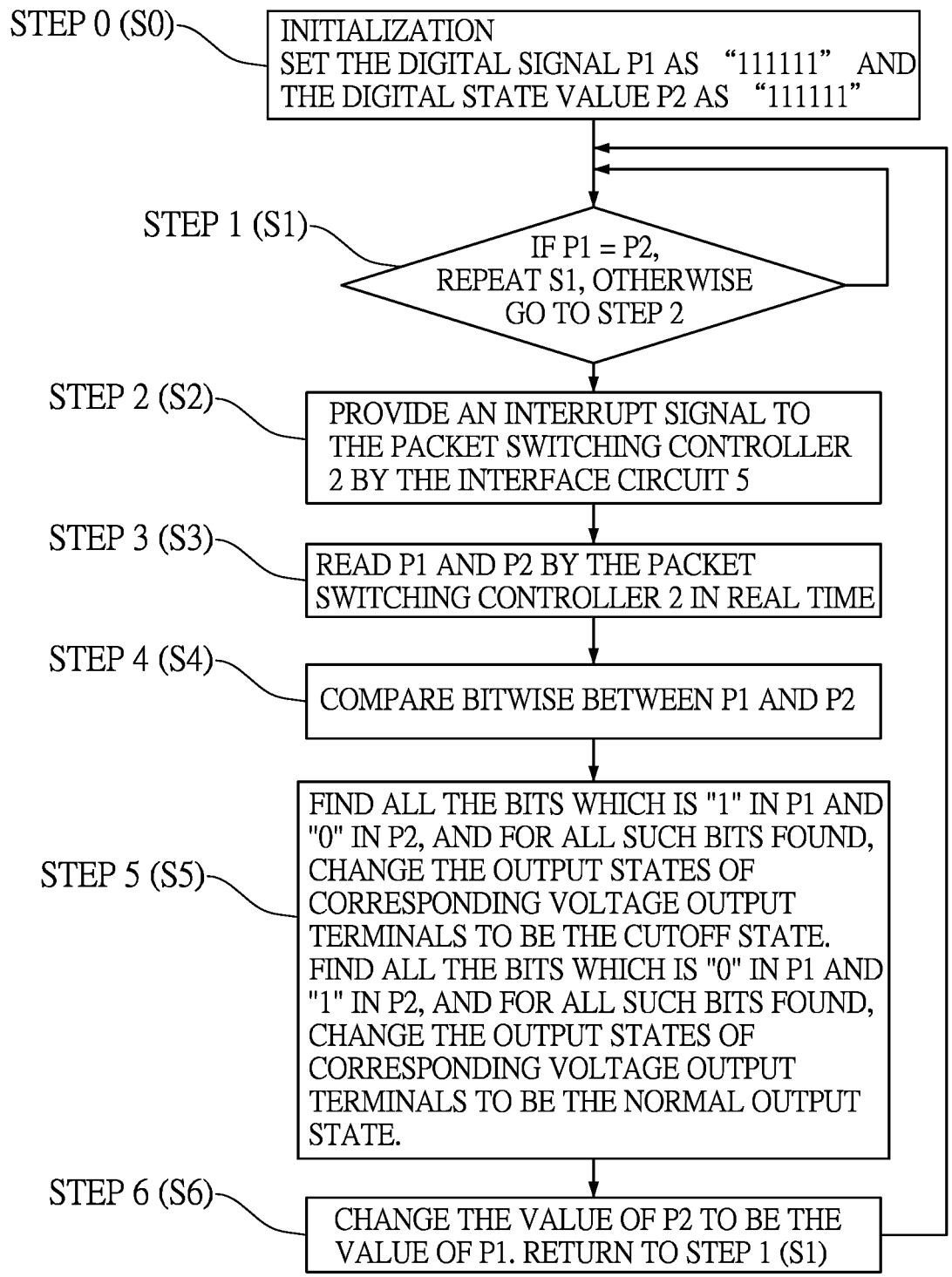
FIG. 2 is a flowchart of the power supplying method of the present invention.

Please refer to FIG. 2. The operations of the hot swapping protection device 1 of the present invention further includes a process flow with the following steps:

Step 0 (S0): Set the digital state value P2 in the interface circuit 5 to be "111111", and set the switches 61 to 66 of the state setting switch group 6 to output the digital signal P1 with value "111111".

Step 1 (S1): Set the digital signal P1 through the switches 61 to 66 of the state setting switch group 6. If the value of the digital signal P1 is equal to the digital state value P2, repeat step 1 (S1); otherwise go to step 2.

Step 2 (S2): The interface circuit 5 provides an interrupt signal to the packet switching controller 2.

Step 3 (S3): The packet switching controller 2 reads the digital signal P1 and the digital state value P2 in real time.

Step 4 (S4): Compare bitwise the digital signal P1 and the digital status value P2.

Step 5 (S5): Find all bits which are "1" in the digital signal P1 and "0" in the digital state value P2, and for all such bits found, change the output states of corresponding voltage output terminals to be the cutoff state. Find all bits which are "0" in the digital signal P1 and "1" in the digital state value P2, and for all such bits found, change the output states of corresponding voltage output terminals to be the normal output state.

Step 6 (S6): Change the value of the digital state value P2 to be the value of the digital signal P1. Return to step 1 (S1).

Even though the above embodiment only includes the first and second connectors 9, 10 in similar manners, it is obvious that the above embodiment can be expanded to include more than two Ethernet connectors, to add more bits for the state setting switch group 6, to increase the number of voltage output terminals of the analog power controller 4, or to increase the number of external network devices connected, etc.

In summary, the user can easily set the mode of the switches 61 to 66 of the state setting switch group 6 to select the voltage output state of each of the first to sixth voltage output terminals 41 to 46 of the analog power controller 4. Therefore, the power supplied to the first and second connectors 9, 10 can be turned off before hot swapping the first and second connectors 9, 10, and sparks generated during hot swapping the connectors are thus prevented, thereby achieving the purpose of the present invention of hot swapping protection device for Power over Ethernet and method thereof.

The aforementioned are preferred embodiments of the present invention. It should be noted that for those of ordinary skill in the art, without departing from the principles of the present invention, certain improvements and retouches of the present invention can still be made which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A hot swapping protection device for Power over Ethernet including:
    a state setting switch group including multiple switches configured to set a digital signal and to output the digital signal;
    an interface circuit having a digital state value, wherein the interface circuit is electrically connected to the state setting switch group and receives the digital signal from the state setting switch group;
    a power supply device to output at least one pair of direct current (DC) voltages;
    a packet switching controller including
        a central processing unit electrically connected to the interface circuit, receiving the digital state value and the digital signal from the interface circuit, and comparing bitwise the received digital state value and the received digital signal so as to output a command to control and to output the at least one pair of DC voltages of the power supply device.

2. The hot swapping protection device for Power over Ethernet as claimed in claim 1, wherein the packet switching controller further includes:
   a physical layer transceiver, including:
      multiple output differential signal terminals; and
      multiple input differential signal terminals.

3. The hot swapping protection device for Power over Ethernet as claimed in claim 2, further including:
   multiple isolation coil sets, wherein each isolation coil set has a first side and a second side, and on the first side, each isolation coil set is electrically connected to corresponding output differential signal terminals and corresponding input differential signal terminals among the multiple output differential signal terminals and the multiple input differential signal terminals; and
   multiple identical and independent connectors, where each connector is on the second side of a corresponding isolation coil set among the multiple isolation coil sets, and inductively coupled to the corresponding output differential signal terminals and corresponding input differential signal terminals through the corresponding isolation coil set.

4. The hot swapping protection device for Power over Ethernet as claimed in claim 3, wherein the power supply device further includes:
   a digital power controller which is electrically connected to the central processing unit, receives the command from the central processing unit, and outputs a control signal accordingly; and
   an analog power controller having multiple voltage output terminals where each of the multiple voltage output terminals is electrically connected to the second side of a corresponding isolation coil set among the multiple isolation coil sets, and the analog power controller being electrically connected to the digital power controller, and receiving the control signal from the digital power controller, thereby to control voltage output states of the multiple voltage output terminals, wherein the voltage output states include a normal output state and a cutoff state.

5. The hot swapping protection device for Power over Ethernet as claimed in claim 4, wherein each of the multiple connectors outputs a pair of DC voltages to an external network device through a cable as the power source for the external network device.

6. The hot swapping protection device for Power over Ethernet as claimed in claim 5, wherein before removing a cable connected to a corresponding connector among the multiple connectors, all the voltage output states of the voltage output terminals corresponding to said connector are set to be the cutoff state.

7. The hot swapping protection device for Power over Ethernet as claimed in claim 1, wherein the state setting switch group further includes:
   multiple switches and each of the multiple switches including:
      an output terminal;
      an input terminal;
      a grounding resistor having two ends which are respectively electrically connected to a grounding voltage and the output terminal;
      a pull-up resistor having two ends which are respectively electrically connected to a digital voltage and the input terminal; and
      a first button which is switchable between an on-state and an off-state;
   when the first button is switched to the on-state, the voltage at the output terminal is a digital high-level voltage, and when the first button is switched to the off-state, the voltage at the output terminal is a digital low-level voltage.

8. A power supply method, providing a hot swapping protection device for Power over Ethernet as claimed in claim 1, and the power supply method including the following steps:
   S0: setting an initial value for a digital state value of an interface circuit, and setting said initial value for a digital signal of a state setting switch group;
   S1: setting the value of the digital signal of the state setting switch group, and when the digital signal and the digital state value are the same, repeating step S1, and when the digital signal and the digital state value are not the same, proceeding to step S2;
   S2: providing an interrupt signal to a packet switching controller by the interface circuit;
   S3: reading the digital signal and the digital state value by the packet switching controller;
   S4: comparing the digital signal and the digital state value bitwise;
   S5: finding all bits which are "1" in the digital signal and "0" in the digital state value, and changing the voltage output states to cutoff states for all voltage output terminals corresponding to all the bits found; and finding all bits which are "0" in the digital signal and "1" in the digital state value, and changing the voltage output states to normal output states for all voltage output terminals corresponding to all the bits found;
   S6: changing the digital state value to be the same as the digital signal, and returning to step S1.

* * * * *